United States Patent [19]

Sara

[11] Patent Number: 4,770,825

[45] Date of Patent: Sep. 13, 1988

[54] PROCESS FOR PRODUCING ELECTRODES FROM CARBONACEOUS PARTICLES AND A BORON SOURCE

[75] Inventor: Raymond V. Sara, Parma, Ohio

[73] Assignee: Union Carbide Corporation, Danbury, Conn.

[21] Appl. No.: 6,690

[22] Filed: Jan. 22, 1987

Related U.S. Application Data

[63] Continuation of Ser. No. 577,371, Feb. 6, 1984, abandoned, which is a continuation of Ser. No. 443,098, Nov. 19, 1982, abandoned.

[51] Int. Cl.[4] .................... B29C 47/00; B29C 71/00; C01B 31/04

[52] U.S. Cl. .................................. 264/29.1; 204/294; 252/503; 252/506; 252/510; 264/105; 264/211; 264/211.11; 264/211.12; 423/448; 423/449

[58] Field of Search ...................... 264/29.1, 29.5, 61, 264/63, 105, 211, 211.11, 211.12; 423/448, 449; 204/292, 294; 252/502, 503, 506, 510; 106/281 R

[56] References Cited

U.S. PATENT DOCUMENTS 3,616,045 10/1971 Tatabanya et al. .............. 264/30 X

*Primary Examiner*—Jeffery Thurlow
*Assistant Examiner*—Leo B. Tentoni
*Attorney, Agent, or Firm*—James L. Sonntag

[57] ABSTRACT

A carbonaceous source material, other than premium petroleum coke is subjected to the action of elemental boron or a boron compound, whereby the highly disordered structure is transformed into one that is very graphitic in an otherwise conventional electrode manufacturing process.

4 Claims, 1 Drawing Sheet

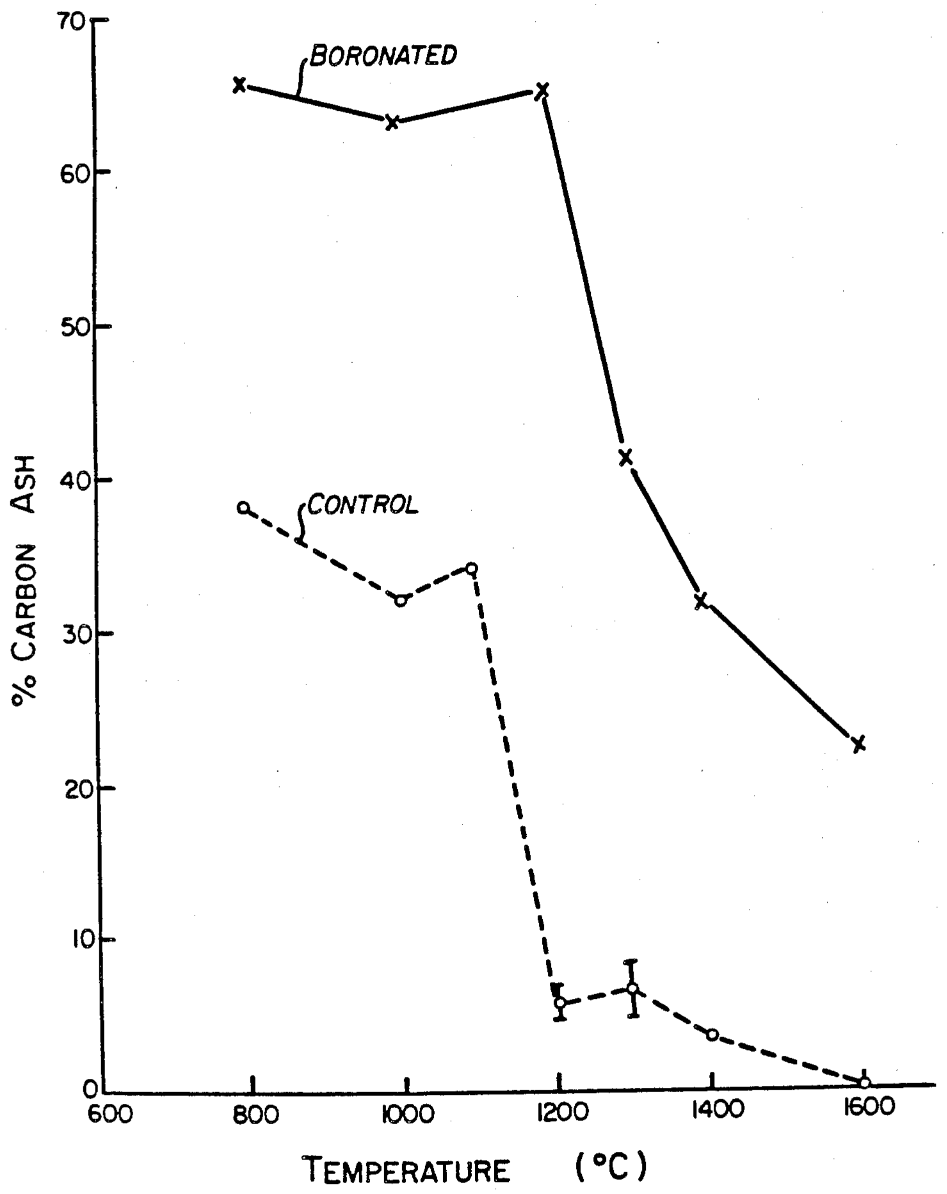
70
60
50
40
30
20
10
0
% CARBON ASH
BORONATED
CONTROL
600
800
1000
1200
1400
1600
TEMPERATURE (°C)

PROCESS FOR PRODUCING ELECTRODES FROM CARBONACEOUS PARTICLES AND A BORON SOURCE

This application is a continuation of prior U.S. application Ser. No. 577,371, filing date Feb. 6, 1984, and is a continuation of application Ser. No. 443,098, filing date Nov. 19, 1982, both now abandoned.

FIELD OF THE INVENTION

The invention relates to a unique process for manufacturing graphite electrodes for electric arc furnace applications and the unique electrodes resulting from the practice of the process.

STATEMENT OF THE PRIOR ART

Premium petroleum cokes are used extensively in the manufacture of electrodes for steelmaking with electric arc furnaces. The cost of such cokes is increasing very rapidly, however, and this could markedly affect the future growth of the use of electric arc furnaces and thus the market for electric arc electrodes. Less costly carbonaceous materials, such as anthracite coal, bituminous coal, lignites, so-called No. 2 and No. 3 cokes, etc., have been tested in the production of electrodes intended for use in electric arc furnaces but the properties of the resulting electrodes are sufficiently inferior when compared to electrodes made from premium petroleum coke that they have been unacceptable for use in electric furnaces. Efforts to upgrade the properties of electrodes made from other than wholly petroleum coke as the carbonaceous source material to acceptable levels have been unsuccessful to date.

The princpal object of this invention is to provide a method for manufacturing electrodes acceptable for use in electric arc furnaces in which the starting carbonaceous source material is not necessarily entirely premium grade petroleum coke.

SUMMARY OF THE INVENTION

This invention resides in subjecting a carbonaceous source material, other than premium petroleum coke, and preferably anthracite coal, to the action of elemental boron or a boron compound, preferably boron carbide ($B_4C$), whereby the highly disordered structure of the anthracite coal is transformed into one that is very graphitic in an otherwise conventional electrode manufacturing process.

BRIEF DESCRIPTION OF THE DRAWING

The single FIGURE of the drawing is a graph illustrating the improvement in oxidation resistance of electrodes employing in their manufacture boronated anthracite coal as compared to electrodes employing non-boronated anthracite coal.

DETAILED DESCRIPTION OF THE INVENTION

In the practice of the invention, particles of a non-petroleum coke carbonaceous material are mixed together with the conventional pitch binder and lubricants, and to this mixture is added elemental boron or a boron containing compound. Acceptable carbonaceous source materials other than anthracite coal are bituminous coal, lignites and No. 2 and No. 3 cokes. Preferably, the boron source is one which does not release a gaseous by-product when it is to be reacted with the carbonaceous material at the graphitization step in the manufacturing process. Such boron sources are elemental boron, boron carbide ($B_4C$), silicon tetraboride ($B_4Si$) and iron boride (FeB). It should also be appreciated that the boron material can be incorporated with the carbonaceous material during calcination and, in this procedure, the boron compound may be an oxide such as boric acid ($H_3BO_3$) or boric acid ($B_2O_3$) since the gaseous by-product formed would have no effect on the structural integrity of the finished electrode.

EXAMPLE

Six-inch diameter coarse-grain anthracite coal electrodes were formed by extrusion. The anthracite coal was calcined at 2200° C. prior to crushing and sizing. The coal particles, pitch, lubricants, and $B_4C$ additions to the mixes are indicated in Table I. The control mix had no boron, whereas the mix for the boronated stock was formulated to produce a finished product having approximately three weight percent boron.

TABLE I

| | Coarse-grain Electrode Mixes | |
|---|---|---|
| Component | Control | Boronated |
| Coal Particles Ranging in Size from 0.03" to 0.25" | 240 lbs. | 240 lbs. |
| Coal Flour, 55% through 200 Mesh | 160 lbs. | 160 lbs. |
| Extrusion Lubricants | 5.4 lbs. | 5.6 lbs. |
| 110° C. Melting Point Coal Tar Pitch | 98 lbs. | 102 lbs. |
| $B_4C$ | 0.0 | 18.0 lbs. |

The $B_4C$ was Carborundum Company Technical Grade 325/F, containing seventy-two percent boron and a maximum particle size of 44 μm. The $B_4C$ and flour were blended in a ribbon blender for one hour prior to mixing with the other additions in a sigma-bladed heated mixer. A mix temperature of 158° C. was achieved. The mix was then cooled to 110° C. and extruded at 105° C. Extrusion pressures varied between 390 and 500 psi for the control and between 400 and 800 psi for the boronated mix. The higher extrusion pressure for the boron-containing mix indicates that insufficient binder was present, which should probably be detremental to physical properties, especially strength. However, in spite of this, as shown in Table II, the boronated electrode had significantly higher strength than the control electrode. Eight billets measuring six inches diameter by eighteen inches long were formed from each mix.

The billets were packed with coke packing in saggers and baked at 2° C./hour to 500° C., at 10° C./hour to 900° C. and held for approximately ten hours at the latter temperature.

Baked billets were then impregnated with Ashland 240 petroleum pitch. The procedure entailed preheating the billets in an autoclave to 225° C. and evacuating the chamber thereafter for one-half to one hour. The pitch was heated to 250° C. and introduced and the system pressurized to 100 psi. The impregnated billets were packed in coke packing and rebaked at 10° C./hour to 750° C. and held for twenty-hours at the latter temperature.

The graphitization process consisted of heating inductively at a rate of 200° C./hour to 2000° C. and at 400° C./hour to the final temperature of 3000° C. Hold time at 3000° C. was one hour. During graphitization and cooling, the stock is protected from oxidation by coke packing.

Properties obtained on the control and boronated anthracite coal specimens are shown in Table II. With the exception of the CTE, all properties were measured on 1"×1"×6" specimens cut in the extrusion direction (WG) and normal to the extrusion direction (AG). The data are averages of nine AG and eleven WG specimens. The CTE data are essentially room temperature values and these measurements were made on 0.25"×0.75"×6" bars.

TABLE II

Effect of Boronation on Anthracite Coal Electrode Properties

| Specimen | Density (g/cc) | Coefficient of Thermal Expansion CTE (× $10^6$ M/M/°C.) | Resistivity (μΩcm) | Flexural Strength (psi) |
|---|---|---|---|---|
| | | WG Properties | | |
| Control | 1.562 | 0.95 | 1041 | 963 |
| Boronated | 1.611 | 0.58 | 852 | 1321 |
| | | AG Properties | | |
| Control | 1.557 | 2.44 | 1926 | 400 |
| Boronated | 1.614 | 1.33 | 1225 | 886 |

The data in Table Ii indicate the boronated material has properties superior to those for the control in both billet directions. The WG CTE and WG resistivity for the boronated coal are significant improvements.

In addition to the foregoing advantages imparted by the employment of boronated anthracite coal over non-boronated anthracite coal, an electrode made with boronated anthracite coal exhibits exceptional resistance to oxidation. This is an important characteristic for electrodes which must perform satisfactorily in the exacting environment of an electric arc furnace.

It appears that, uniquely, boron causes the anthracite coal or other carbonaceous stock to retain its impurities; even after graphitization.

The principal impurities in anthracite coal are compounds of iron, silicon, aluminum, and titanium, and they equate to approximately ten percent ash. Most naturally occurring carbonaceous materials have as impurities similar kinds of elements in varying levels. The vaporization of these materials during graphitization results in lower density, poorer structure and properties. The presence of boron has been observed to prevent their vaporization. Impurities in the boronated carbonaceous stock provide excellent protection against oxidation. This phenomenon is clearly shown as explained below in the single FIGURE of the drawing. The data illustrated in this graph was generated as follows:

One-inch cubes of the control and boronated anthracite coal stock were heated four hours in still air at temperatures between 800° and 1600° C. Material (carbon+ash) was weighed at the end of this time and the results are expressed as percent remaining in the FIGURE. The oxide coating developed in the coal specimens is a very small percentage (2-5 percent) of the remaining mass. Even at 1600° C., a substantial portion of the remaining material is carbon. At 1200° C., the control is almost completely oxidized, whereas approximately sixty percent carbon is retained in the boronated specimen. Accordingly, consumption will be much less for a boronated anthracite coal electrode exposed to electric arc furnace conditions than it would be for the unboronated counterpart.

The range of the amount of boron content to be added to the carbonaceous mix to be extruded into the finished electrode is between 0.1 and 5 percent by weight of the graphitized product, with about three percent being the preferred level of boron addition.

The properties of the boronated anthracite coal stock of the above example when compared to a graphite electrode made from premium petroleum coke are shown below in Table III.

TABLE III

Properties of Boronated Anthracite Coal Electrode and Premium Petroleum Coke Electrodes

| Specimen | Density (g/cc) | Coefficient of Thermal Expansion CTE (× $10^6$ M/M/°C.) | Resistivity (μΩcm) | Flexural Strength (psi) |
|---|---|---|---|---|
| | | WG Properties | | |
| Boronated Anthracite Coal | 1.611 | 0.58 | 852 | 1321 |
| Premium Petroleum Coke | 1.639 | 0.58 | 756 | 1261 |

As will be appreciated the properties of the electrodes of the invention compare very favorably with those that are available from conventional processing using premium petroleum coke.

Finally, it should also be appreciated that new, and lower cost electrodes suitable for use in electrical arc furnaces will also be achieved in those instances where the non-petroleum coke carbonaceous stock material which has been subjected to boronation replaces only a portion of the petroleum coke stock material rather than replacing it entirely.

I claim:

1. A method of making an electrode suitable for use in an electric arc steel melting furnace which comprises: (a) hot mixing calcined anthracite coal particles, pitch, lubricants and boron carbide, such that boron is present in the amount of about 3 weight percent of the electrode to form a mix, (b) extruding said mix into an electrode form; and (c) heating said electrode form to graphitizing temperatures to provide a graphite electrode.

2. A method of making an electric arc furnace graphite electrode comprising: (a) calcining a carbonaceous material selected form the group consisting of anthracite coal, bituminous coal, lignites, and nos. 2 and 3 cokes; (b) mixing the calcined carbonaceous material with pitch, a lubricant, and a boron source selected from the group consisting of elemental boron, boron carbide, silicon tetraboride, and iron boride, in an amount such that the boron content is from about 0.1 to about 5.0 percent by weight of the graphite electrode to form a mixture; (c) extruding said mixture into an electrode form; (d) and graphitizing said electrode form to provide a graphite electrode.

3. The method of claim 2 wherein the boron source is boron carbide.

4. The method of claim 2 wherein the boron content of the graphite electrode is about 3.0 percent by weight of the electrode.

* * * * *